Patented Mar. 12, 1935

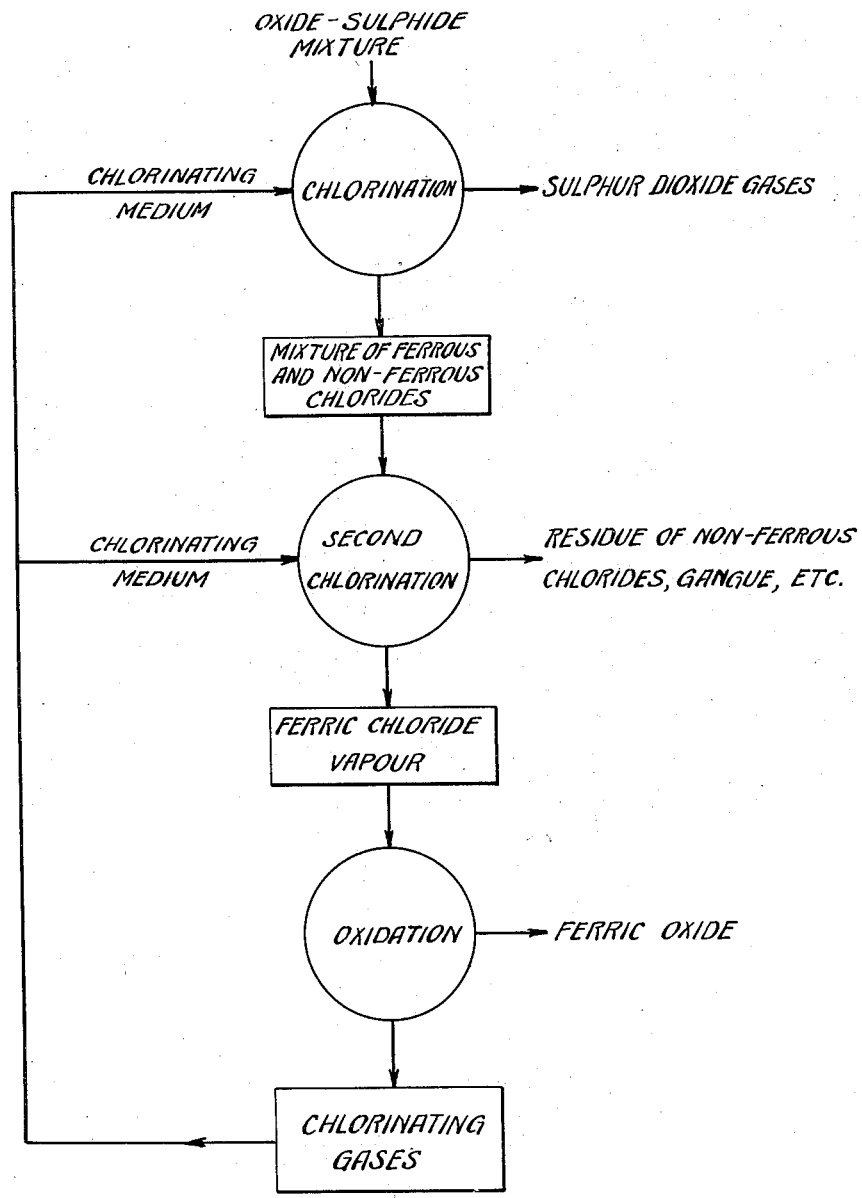

1,994,367

UNITED STATES PATENT OFFICE 1,994,367

TREATMENT OF OXIDE IRON ORES AND OTHER MATERIALS CONTAINING IRON IN OXIDE FORM

William Somerville Millar, London, England; Henry Dering, executor of said William Somerville Millar, deceased, assignor, by mesne assignments, to Sulphide Corporation, New York, N. Y., a corporation of Delaware Application July 2, 1929, Serial No. 375,572
In Great Britain July 3, 1928

17 Claims. (Cl. 23—200)

It is well known that the oxides of many metals may be converted into the chlorides of the metals by the action of chlorine gas, if the oxide is subjected to the simultaneous reducing action of carbon. Thus, for example, ferric oxide is not attacked by chlorine, but if carbon is mixed with the oxide, and chlorine passed over the heated mixture, ferrous or ferric chloride, or both, are formed, together with carbon dioxide.

It has hitherto been thought that only carbon could be used to effect the reducing action and that the presence of sulphur and sulphides would be inimical to the chlorinating reaction, or at best, would not be productive of any useful result in connection with this reaction. I have now found, however, as a result of experimental research, that so far from being inimical, sulphur and sulphides possess special advantages in many cases.

In accordance with the present invention, sulphur, sulphide of iron, or ore, mineral or other material containing iron and sulphur, such as pyrites, pyrrhotite, chalcopyrite, spent oxide, etc., is intimately mixed with oxide of iron, or material containing oxide of iron, such as pyrites cinders, other roasted ore or mineral, or naturally occurring oxide materials containing iron, and subjected, with or without drying, heating or other preliminary treatment, to the action of chlorine gas, or other gases or vapours containing chlorine, free or combined, such as chlorides of sulphur, ferric chloride, etc., with or without inert gases.

In the simplest case, using ferric oxide and pyrites as the oxide and sulphide materials respectively, the reaction may be expressed by the equation

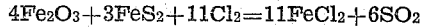

$$4Fe_2O_3 + 3FeS_2 + 11Cl_2 = 11FeCl_2 + 6SO_2$$

the products being ferrous chloride and sulphur dioxide.

With sulphur, the reaction proceeds according to the equation

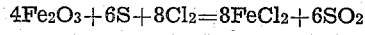

$$4Fe_2O_3 + 6S + 8Cl_2 = 8FeCl_2 + 6SO_2$$

and with sulphur chloride

$$4Fe_2O_3 + 3S_2Cl_2 + 5Cl_2 = 8FeCl_2 + 6SO_2$$

With chalcopyrite, pyrrhotite, and other sulphide minerals, the reaction is similar.

The gaseous product, when the proportions of reagents are selected in accordance with the above equations, is in all cases sulphur dioxide, which may be employed in the manufacture of sulphuric acid, or for other known purposes. If the chlorinating medium contains no inert gases, the sulphur dioxide will be pure; if the chlorinating medium contains nitrogen, carbon dioxide, etc., these inert gases pass through the reaction chamber, and a dilute sulphur dioxide gas is obtained.

It is obvious that excess of sulphide material may be used, in which case a part of the chlorine or other gaseous chlorinating agent employed will react with the excess sulphide material according to known reactions to give sulphur and the chlorides of the metals; the sulphur may be condensed from the exit gases in known manner, the sulphur dioxide passing on as before.

If excess of oxide is used, this is not attacked, and merely remains behind, admixed with the metallic chlorides.

Where, as is generally the case, the oxide or sulphide material (or both) contains non-ferrous metals, these are converted into the chlorides, which may remain with the ferrous chloride, or pass over with the gases, according to their degrees of volatility, the temperature of reaction, and the volume of inert gases present in the chlorinating medium. Where such non-ferrous chlorides are volatilized, they may be separated from the gases by means of a suitable condenser or settling chamber.

The mixture of ferrous chloride with chlorides of non-ferrous metals obtained as a result of the reaction if chlorine be not used in excess may be dissolved in water for separation of pure ferrous chloride, which may be subsequently electrolyzed for recovery of metallic iron and chlorine. Alternatively, ferric chloride may be formed from the ferrous chloride by treatment of the chloride mixture with air or oxygen, or with excess of chlorine, at a moderate temperature, say 250–500° C., and thereby separated from the gangue and non-volatile chlorides; ferric chloride so formed may then be oxidized by means of air or oxygen at high temperatures, say 500–1000° C., with formation of pure ferric oxide and recovery of chlorine.

The chlorine recovered, either by electrolysis or oxidation, is equivalent in quantity to that used in chlorination, less the amount remaining combined with non-ferrous metals, and may be employed again, either directly or indirectly, for treatment of further quantities of the oxide-sulphide mixture. Where the chlorine used is to be recovered by electrolysis, the mixture of ferrous chloride and chlorides of non-ferrous metals may be dissolved in the minimum quantity of water (or mother-liquor from a previous operation) at 80° C. or higher temperature. On being allowed to cool this solution separates pure ferrous chloride crystals which are used for the electrolytic bath. The mother-liquor is then freed from copper, if present, by precipitation with iron, and from lead, if present, by electrolysis between iron electrodes at a potential difference of about 1 volt or less. The mother-liquor is then used for dissolving further quantities of anhydrous chlorides at 80° or higher temperature, and this crystallization cycle repeated indefinitely. If zinc is present it will accumulate in the mother-liquor by reason of the great solubility of the zinc chloride; in this case the cycle is repeated only until the liquor becomes so rich in zinc that it becomes difficult to wash the separated ferrous chloride crystals free from zinc chloride, at which point the liquor is withdrawn from the cycle and worked up for recovery of zinc whilst the cycle is started afresh with water.

It will be seen that by my process I am able to obtain from any iron oxide-sulphide mixture, by a series of simple chemical operations, and without loss of chlorine, pure ferric oxide or metallic iron, all the sulphur present for reducing the iron oxide as sulphur dioxide, and the non-ferrous metals as chlorides.

The reaction may be carried out at any temperature from 200° C. upwards, but is most conveniently effected between 300 and 500° C. Stationary furnaces may be employed, but it will generally be necessary in such cases, unless high proportions of gangue or inert material are present, to admix coarse sand or inert material with the charge to avoid blockage by the chlorides formed. A rotating cylindrical furnace, in which the solid oxide-sulphide mixture is fed in at one end, and the solid chlorides are drawn off at the other, lower end, is very convenient; in this case, the chlorinating gases enter at the lower end, at which the solid chlorides are discharged, so that the re-agents move in counter-current to one another.

Where zinc and lead are present, it is advisable to keep the temperature below 400° C., since the chlorides of these metals begin to be volatilized above this point, especially if inert gases are present in the chlorinating medium. Where these metals are absent, or present in only small quantities, a temperature of 450–500° C. may be used.

It will be appreciated that my method is especially suitable for treatment of pyrites cinders, roasted sulphide ores, mattes, etc. since these generally contain oxides and sulphides present together, and it is a simple matter to bring the composition to the ratio of oxide to sulphide required by the equation. Thus with pyrites cinders, which contain usually 3–4% of sulphur, or more if the pyrites has been roasted in lump burners, it is necessary to add only from 35–45 parts fresh pyrites to 100 parts cinders, according to the compositions of the two materials and treat the mixture with the chlorinating medium; the sulphur is obtained as SO₂, and the zinc, lead, copper etc. are obtained as chlorides. By the appropriate treatment of the chloride mixture formed, the chlorine used for fixing the iron content as chloride is recovered, and the iron is obtained either as metal, where the chloride is electrolyzed, or as oxide, where oxidation is employed, without use of any other raw material.

Since moisture acts readily on the chlorides formed, yielding hydrochloric acid, which may cause loss of chlorine, it is desirable to dry the materials before treatment. In those cases where the materials contain soluble salts, it may be desirable also to extract these with water or suitable solution. The washing and drying may take place before or after blending for chlorination as desired.

It may also be preferred to carry out the reaction in two stages, in the first simply heating the oxide-sulphide mixture to give sulphur dioxide and a material substantially free from oxygen,

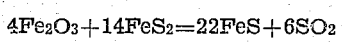

and in the second, treating with the chlorinating medium to obtain sulphur and the metal chlorides,

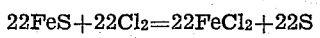

Whilst this two stage treatment has the advantage that the sulphur dioxide gases are obtained by the first operation, so that there is no possibility of admixture with chlorine, and free sulphur is obtained in the second stage, a higher proportion of sulphide material is required, and correspondingly greater quantities of chlorides must be handled. In this case, however, no preliminary drying of the oxide-sulphide mixture is required.

The process as a whole is strongly exothermic, and the desired temperature is readily maintained by regulating the rates of admission of the re-agents. In a stationary furnace, only the rate of admission of the chlorinating medium has to be controlled; in a rotating furnace, the rate of admission of the oxide-sulphide mixture may also be regulated.

The attached flow sheet illustrates one method of carrying out the invention, in which the chlorinating medium is recovered by oxidation. In this form, the mixture of oxides and sulphides is treated first with only sufficient chlorinating medium to convert the iron present into ferrous chloride, the other metals present being also converted into chlorides. The mixture so obtained is treated with a further quantity of chlorinating medium, sufficient to convert the ferrous chloride into ferric chloride; this is volatile at a relatively low temperature, and therefore may readily be separated from the gangue and chlorides of non-ferrous metals. The separated ferric chloride is finally oxidized, yielding ferric oxide and chlorine; more or less ferric chloride may be left unchanged by using less than the theoretical amount of oxygen. The chlorine recovered is employed again, both for the first chlorination of the oxide-sulphide mixture, and for conversion of the ferrous chloride so obtained into ferric chloride.

I claim:

1. A process of treating materials containing iron oxide and chlorinatable values of non-ferrous metals, which comprises admixing therewith materials containing sulphur, adjusting the amount of sulphur-containing material so admixed so as to insure that sufficient sulphur is present in the mixture thus formed to combine with the oxygen of the iron oxide to convert the same to sulphur dioxide, and heating the mixture with chlorine-containing gases to cause the sulphur present to combine with the oxygen of the iron oxide to form sulphur dioxide, and to form chlorides of iron and the non-ferrous metals present.

2. A cyclic process of treating oxide-sulphide mixtures containing iron and non-ferrous metal values, consisting in adjusting the proportions of sulphide to oxide materials present so as to insure that sufficient sulphur is present in the mixture to reduce the oxides and form with the oxygen content thereof sulphur dioxide, treating the adjusted mixture at an elevated temperature sufficient to promote reaction of the sulphide sulphur with the oxides present and with a chlorinating medium to form non-ferrous chlorides and iron chloride, separating the non-ferrous chlorides from the iron chloride formed, treating such iron chloride for the recovery of chlorinating medium, and utilizing such chlorinating medium for the treatment of further quantities of oxide-sulphide mixture.

3. A cyclic process of treating oxide-sulphide mixtures containing iron, consisting in treating such mixtures with a chlorinating medium to form non-ferrous chlorides and iron chloride, separating the non-ferrous chlorides from the iron chloride formed, electrolyzing such iron chloride for the recovery of chlorinating medium, and utilizing such chlorinating medium for the treatment of further quantities of oxide-sulphide mixture.

4. A cyclic process of treating oxide-sulphide mixtures containing iron, consisting in adjusting the proportions of sulphide to oxide materials present so as to insure that sufficient sulphur is present in the mixture to reduce the oxides and form with the oxygen content thereof sulphur dioxide, treating the adjusted mixture at an elevated temperature sufficient to promote reaction of the sulphide sulphur with the oxides present and with a chlorinating medium to form non-ferrous chlorides and iron chloride, separating the non-ferrous chlorides from the iron chloride formed, subjecting such iron chloride to oxidation for the recovery of chlorinating medium, and utilizing such chlorinating medium for the treatment of further quantities of oxide-sulphide mixture.

5. A process of treating materials containing iron oxide which comprises admixing therewith materials containing sulphur and heating the mixture thus formed with a chlorinating medium whereby to obtain sulphur dioxide, the chlorides of iron and the non-ferrous metals present, regulating the proportion of the chlorinating medium and the operating temperature so that substantially the whole of the iron present is obtained in the solid condition as ferrous chloride, treating such ferrous chloride for recovery of a chlorinating medium, and utilizing such chlorinating medium for the treatment of further quantities of oxide-sulphide mixture.

6. A process of treating materials containing iron oxide which comprises admixing therewith materials containing sulphur and heating the mixture thus formed with a chlorinating medium whereby to obtain sulphur dioxide, the chlorides of iron and the non-ferrous metals present, regulating the proportion of chlorinating medium and the operating temperature so that substantially the whole of the iron present is driven off in the volatile form as ferric chloride, treating such ferric chloride for recovery of a chlorinating medium, and utilizing such chlorinating medium for the treatment of further quantities of said mixture.

7. A process of treating materials containing iron oxide which comprises admixing therewith materials containing sulphur, heating the mixture thus formed with chlorine-containing gases at a temperature above 200° C. whereby to obtain sulphur dioxide, the chlorides of iron and the non-ferrous metals present, separating the non-ferrous chlorides from the iron chlorides formed, treating such iron chlorides for the recovery of a chlorinating medium, and utilizing such chlorinating medium for the treatment of further quantities of said mixture.

8. A process of treating materials containing iron oxide which comprises admixing therewith materials containing sulphur, heating the mixture to drive off moisture and other volatile bodies, subjecting the residue to the action of a chlorinating medium in such proportion and at a temperature such as to obtain substantially the whole of the iron present in the solid condition as ferrous chloride, separating such ferrous chloride from any non-ferrous chlorides and gangue present and treating it for recovery of a chlorinating medium, and utilizing such chlorinating medium for the treatment of further quantities of said mixture.

9. A process of treating materials containing iron oxide and chlorinatable values of non-ferrous metals, which comprises admixing therewith materials containing sulphur, heating the mixture thus formed with a chlorinating medium, regulating the proportion of the chlorinating medium and the operating temperature so that substantially the whole of the iron present in the mixture is obtained in the solid condition as ferrous chloride and said non-ferrous metal values have been changed to chloride form, subjecting the mixture of chlorides containing ferrous chloride to the action of chlorine to form and volatilize ferric chloride, treating such ferric chloride for recovery of a chlorinating medium, and utilizing such chlorinating medium for the treatment of further quantities of said mixture.

10. A process of treating materials containing iron oxide and chlorinatable values of non-ferrous metals, which comprises admixing therewith materials containing sulphur and heating the mixture thus formed with a chlorinating medium, regulating the proportion of the chlorinating medium and the operating temperature so that substantially the whole of the iron present in the mixture is obtained in the solid condition as ferrous chloride and said non-ferrous metal values have been changed to chloride form, subjecting the mixture of chlorides containing ferrous chloride to the action of limited quantities of gases containing oxygen at a moderate temperature to form and volatilize ferric chloride, treating such ferric chloride for recovery of a chlorinating medium, and utilizing such chlorinating medium for the treatment of further quantities of said mixture.

11. A process of treating materials containing iron oxide and chlorinatable values of non-ferrous metals, which comprises admixing therewith materials containing sulphur and heating the mixture thus formed with a chlorinating medium, regulating the proportion of the chlorinating medium and the operating temperature so that substantially the whole of the iron present in the mixture is obtained in the solid condition as ferrous chloride and said non-ferrous metal values have been changed to chloride form, subjecting the mixture of chlorides containing ferrous chloride to oxidizing action at a temperature between 250° C. and 550° C. to form and volatilize ferric chloride, treating such ferric chloride for recovery of a chlorinating medium, and utilizing such chlorinating medium for the treatment of further quantities of said mixture.

12. A process of treating materials containing iron oxide and chlorinatable values of non-ferrous metals, which comprises admixing therewith materials containing sulphur and heating the mixture thus formed with a chlorinating medium, regulating the proportion of the chlorinating medium and the operating temperature so that substantially the whole of the iron present in the mixture is obtained in the solid condition as ferrous chloride and said non-ferrous metal values have been changed to chloride form, subjecting the mixture of chlorides containing ferrous chloride to the action of limited quantities of oxygen at a moderate temperature to form and volatilize ferric chloride at a temperature between 250° C. and 550° C., treating such ferric chloride for recovery of a chlorinating medium, and utilizing such chlorinating medium for the treatment of further quantities of said mixture.

13. A process of treating materials containing iron oxide and chlorinatable values of non-ferrous metals, which comprises admixing therewith materials containing sulphur and heating the mixture thus formed with chlorinating medium, regulating the proportion of the chlorinating medium and the operating temperature so that substantially the whole of the iron present in the mixture is obtained in the solid condition as ferrous chloride and said non-ferrous metal values have been changed to chloride form, subjecting the mixture of chlorides containing ferrous chloride to oxidation to form ferric chloride, oxidizing the ferric chloride at high temperatures to form pure ferric oxide and regenerate chlorine, and utilizing such chlorine for the treatment of further quantities of said mixture.

14. A process of treating materials containing iron oxide and chlorinatable values of non-ferrous metals, which comprises admixing therewith materials containing sulphur and heating the mixture thus formed with a chlorinating medium, regulating the proportion of the chlorinating medium and the operating temperature so that substantially the whole of the iron present in the mixture is obtained in the solid condition as ferrous chloride and said non-ferrous metal values have been changed to chloride form, subjecting the mixture of chlorides containing ferrous chloride to oxidation to form ferric chloride, oxidizing such ferric chloride at a temperature between 600° C. and 1200° C. to form ferric oxide and regenerate chlorine, and utilizing such chlorine for the treatment of further quantities of said mixture.

15. A process of treating materials containing iron oxide and chlorinatable values of non-ferrous metals, which comprises admixing therewith materials containing sulphur and heating the mixture thus formed with a chlorinating medium, regulating the proportion of chlorinating medium and the operating temperature so that substantially the whole of the iron present in the mixture is driven off in the volatile form as ferric chloride, recovering the non-ferrous chlorides from the residue by extraction with aqueous solvent, treating the ferric chloride driven off for recovery of a chlorinating medium, and utilizing such chlorinating medium for the treatment of further quantities of said mixture.

16. A process of treating materials containing iron oxide and chlorinatable values of non-ferrous metals, which comprises admixing therewith materials containing sulphur and heating the mixture thus formed with a chlorinating medium, regulating the proportion of chlorinating medium so that substantially the whole of the iron present in the mixture is obtained as ferrous chloride, dissolving the mixture of chlorides obtained in the minimum quantity of solvent at a temperature of at least 80° C., cooling down to cause separation of pure ferrous chloride crystals, dissolving such pure ferrous chloride crystals, electrolyzing the solution to recover chlorine, and utilizing such chlorine for the treatment of further quantities of said mixture.

17. A process of treating materials containing iron oxide and chlorinatable values of copper, lead and zinc, which comprises admixing therewith materials containing sulphur and heating the mixture thus formed with a chlorinating medium, regulating the proportion of chlorinating medium so that substantially the whole of the iron present in the mixture is obtained as ferrous chloride and the values of copper, lead and zinc have been changed to chloride form, dissolving the mixture of chlorides obtained in the minimum quantity of solvent at a temperature of at least 80° C., and cooling down to cause separation of pure ferrous chloride crystals, freeing the solvent from copper after separation of ferrous chloride crystals by precipitation with iron, and from lead, by electrolysis between iron electrodes at an E. M. F. of about 1 volt or less, using the solvent to dissolve further quantities of the anhydrous chlorides, repeating the cycle until the solvent is rich in zinc, dissolving the separated ferrous chloride crystals, electrolyzing the solution to recover chlorine, and utilizing such chlorine for the treatment of further quantities of said mixture.

WILLIAM SOMERVILLE MILLAR.